W. SANGSTER.
COAL LEVELING MACHINE FOR BEEHIVE OVENS.
APPLICATION FILED JULY 7, 1908.

1,067,199.

Patented July 8, 1913.

WITNESSES:
C. E. Ashley
Charles Engel

INVENTOR
William Sangster
By his Attorney,
Willard Parker Butler

W. SANGSTER.
COAL LEVELING MACHINE FOR BEEHIVE OVENS.
APPLICATION FILED JULY 7, 1908.

1,067,199. Patented July 8, 1913.

WITNESSES:
C. E. Ashley
Charles Engel

INVENTOR
William Sangster
By his Attorney,
Willard Parker Butler

W. SANGSTER.
COAL LEVELING MACHINE FOR BEEHIVE OVENS.
APPLICATION FILED JULY 7, 1908.

1,067,199.

Patented July 8, 1913.

UNITED STATES PATENT OFFICE.

WILLIAM SANGSTER, OF COVINGTON, VIRGINIA, ASSIGNOR TO COVINGTON MACHINE COMPANY, A CORPORATION OF VIRGINIA.

COAL-LEVELING MACHINE FOR BEEHIVE-OVENS.

1,067,199. Specification of Letters Patent. Patented July 8, 1913.

Application filed July 7, 1908. Serial No. 442,305.

*To all whom it may concern:*

Be it known that I, WILLIAM SANGSTER, a citizen of the United States, and resident of Covington, Alleghany county, State of Virginia, have invented a new and useful Improvement in Coal-Leveling Machines for Beehive-Ovens, of which the following is a specification.

My invention relates to improvements in machinery for leveling the coke within coke ovens, and particularly to that class of machine for spreading or leveling the coke in what are known as "beehive" ovens, as distinguished from other classes of oven. The beehive oven is an oven made in the form of a hemisphere, access being had to the interior thereof, through a central opening at the top and through an opening at the side.

The present invention consists of a device which is carried upon a carriage moving upon a track placed above and preferably at one side of a row of beehive ovens, and which carriage by means of appropriate mechanism, is caused to travel along and over the row of ovens and by further appropriate mechanism, to insert the tool into each oven, so move it vertically and horizontally that all parts of the coke within the oven will be successfully subjected to its effect, and thereupon to withdraw it and then subject the next oven in the row to a similar procedure.

The invention will be best understood by reference to the accompanying seven sheets of drawings, in which—

Fig. 10 is a section of the same shaft showing one of the arms in its folded position. Fig. 11 is a plan of the lower part of the shaft and Fig. 12 a plan of the three jointed arm.

Similar letters refer to similar parts throughout the several views.

In the drawings, O represents the wall of an oven with its charging opening at the top $O^1$, and D the door at one side.

Figure 4:
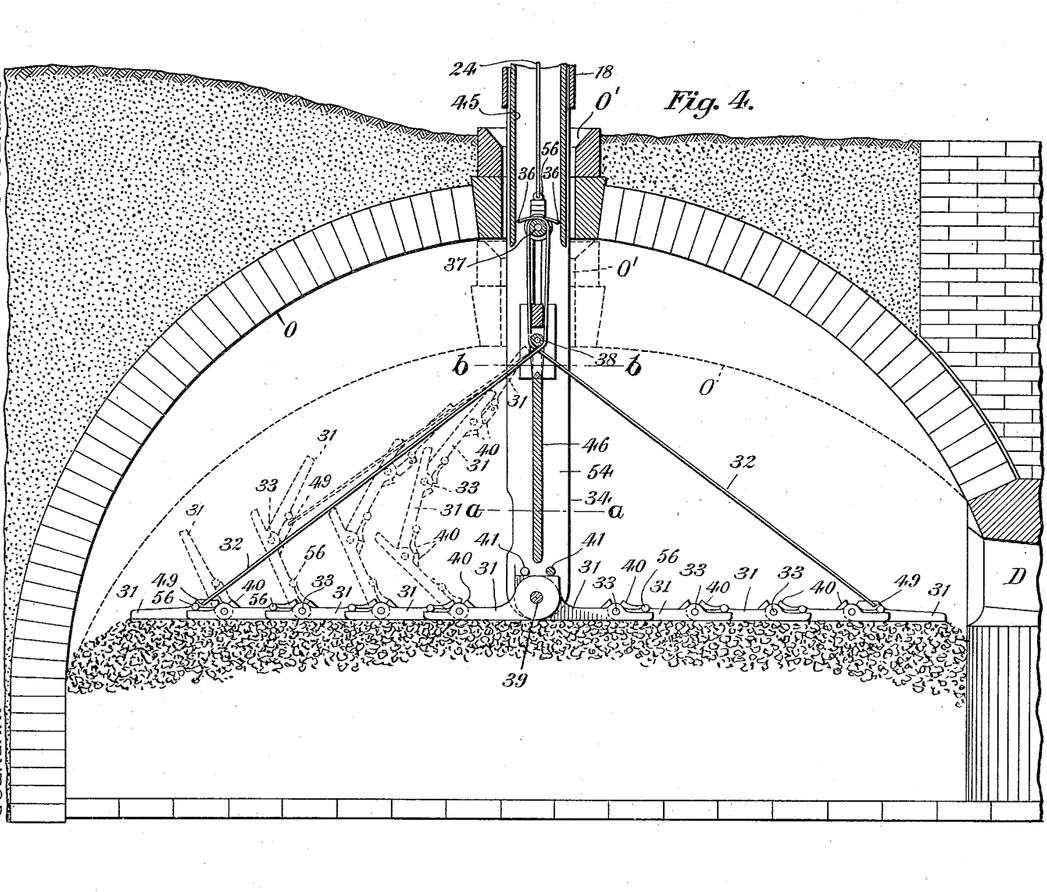
Fig. 4 is a cross section of an oven and a cross section of the lower portion of the vertical shaft with the arms extended to their spreading or leveling position, and as shown by the dotted lines, one of the arms in the various positions it assumes as it is being closed.
Figure 5:
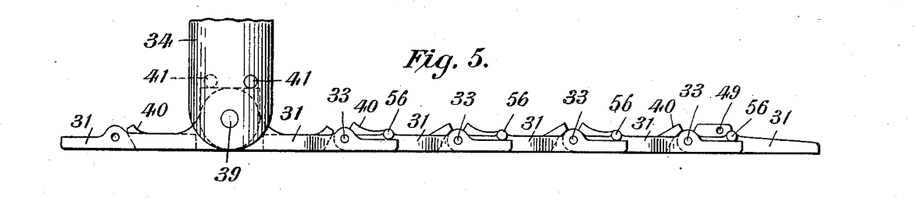
Fig. 5 is a detail elevation of one of the arms with five joints, showing the position of the stops.
Figure 6:
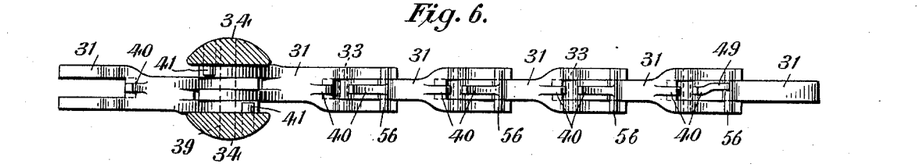
Fig. 6 is a detail plan of the same.
Figure 7:
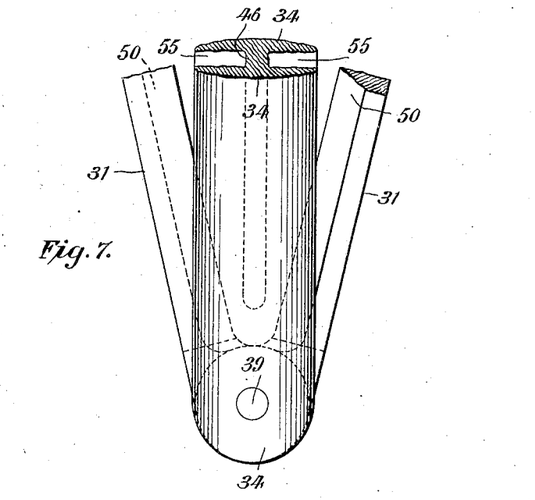
Fig. 7, detail elevation showing the joint at the bottom of the vertical shaft or tube, and Fig. 8, plan of the same.

The dotted lines in Fig. 4 marked O and $O^1$ represent an oven whose top has fallen in by reason of the heat, but which is still in good condition for making coke.

S represents a pair of rails extending along the top of a row of coke ovens on which the larries travel, which convey the coal to the ovens.

The main frame, or truck, of the leveling machine 1 is carried on the axles 2, to which are attached the wheels 3, traveling on the rails S. Motion is given to these axles through the bevel gears 4 by an intermediate shaft, which in turn is driven through bevel gears by a central vertical shaft, having at its upper end the bevel gear 5, meshing with the clutch bevel gear 6 on the main drive shaft 7. The shaft 7 is driven through a spur pinion and gear by the motor 8.

The motor 8 is of the reversing type, and by means of a controller the operator may propel the machine up and down the track, or, in the various movements hereafter described, reverse them in either direction as desired. A brake, not shown, keeps the machine from moving along the tracks while spreading or leveling the coal in an oven.

On the end of the shaft 7 is the worm 9 which meshes with the clutch gear 10 on the vertical shaft 11. On the lower end of this shaft is the pinion 12, meshing with a large circular rack on the frame 2. The main shaft 7 and worm shaft 11 are carried on the turn-table 13, which can be rotated by the pinion and rack 12 through a full circle in either direction around a central pivot through which passes the vertical shaft, referred to above for propelling the machine.

The turn-table 13 is carried on the frame by four conical rollers which are not shown, but which are applied in any convenient manner. The table 13 carries two heavy beams 14 mounted on the trunnions 15 and adjusting screw 16. By means of this screw, any desired dip or inclination may be given the beams 14, and consequently to the spreading or leveling arms.

At one end of the beam 14 is the tower frame 17 which supports and carries the cylinder 18, and the leveling tool proper. The cylinder 18 is raised or lowered by the clutch sprocket 19, which through the sprocket 20, worm 21, and wheel 22, gives motion to the drum 23, which in turn winds or unwinds the cable 24, carrying the cylinder 18.

Figure 2:
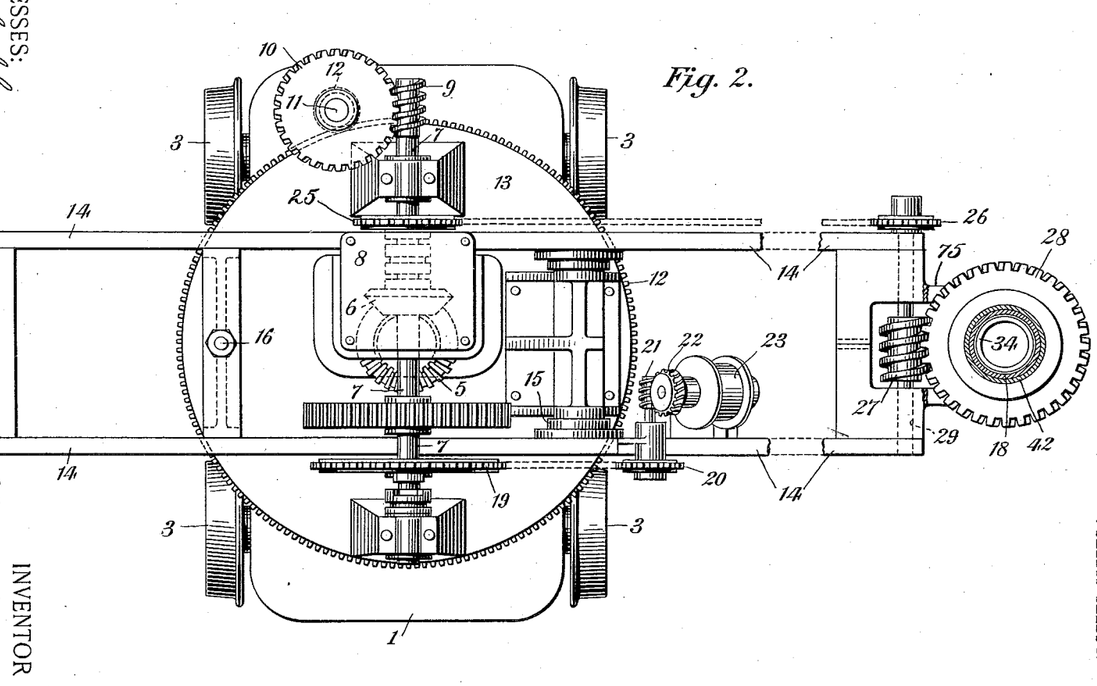
Fig. 2 is a plan view of the carriage and actuating mechanism.
Figure 3:
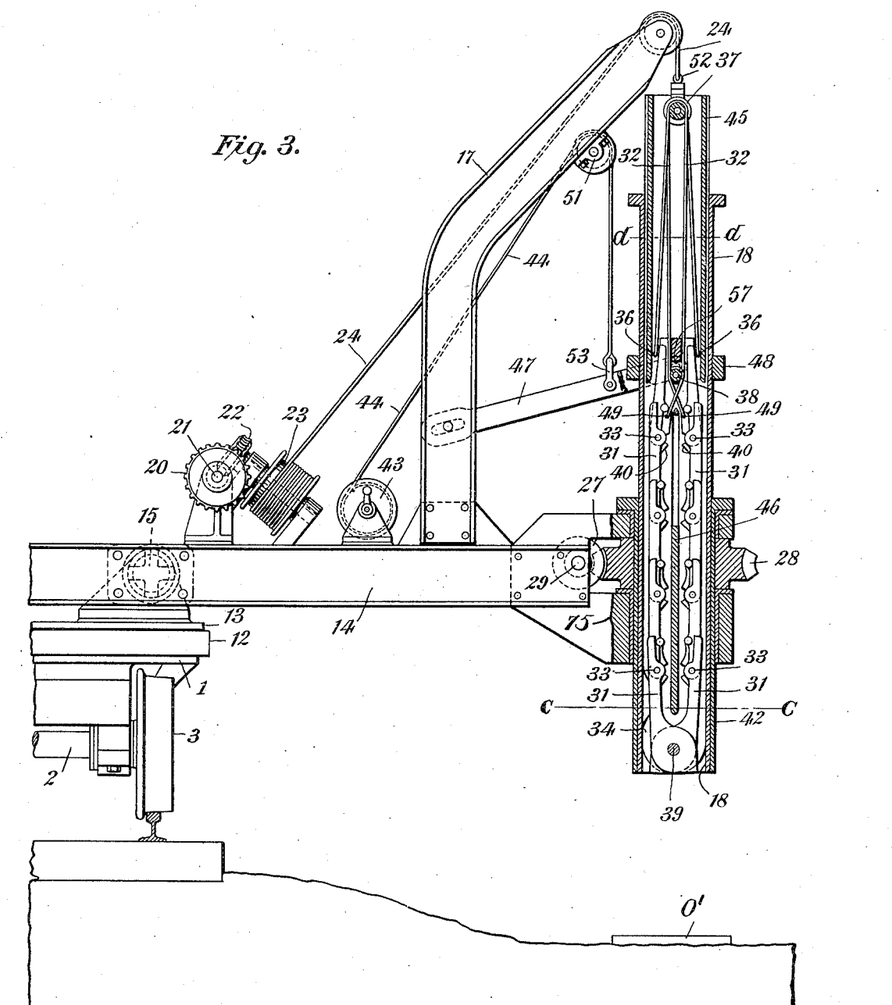
Fig. 3 is a partial elevation of the leveler and a cross section of the vertical shaft, showing the arms and inner tube elevated to their maximum height.

The cylinder 18 is driven by the sprocket 25, on the main shaft 7, through sprocket 26, the shaft 29, the worm 27, the worm wheel 28, and outer tube 42 as shown in Figs. 2 and 3, all of which are carried in a head or frame casting 75 attached to the end of the beam 14. Within the cylinder 18 slides the inner cylinder 34, having its upper portion 45 in the form of a tube and the lower portion somewhat after the shape of the letter I, with a web 46 and flange 54 which may be cut out at the opposite sides as shown in Figs. 3, 4, 13 and 14.

Figure 1:
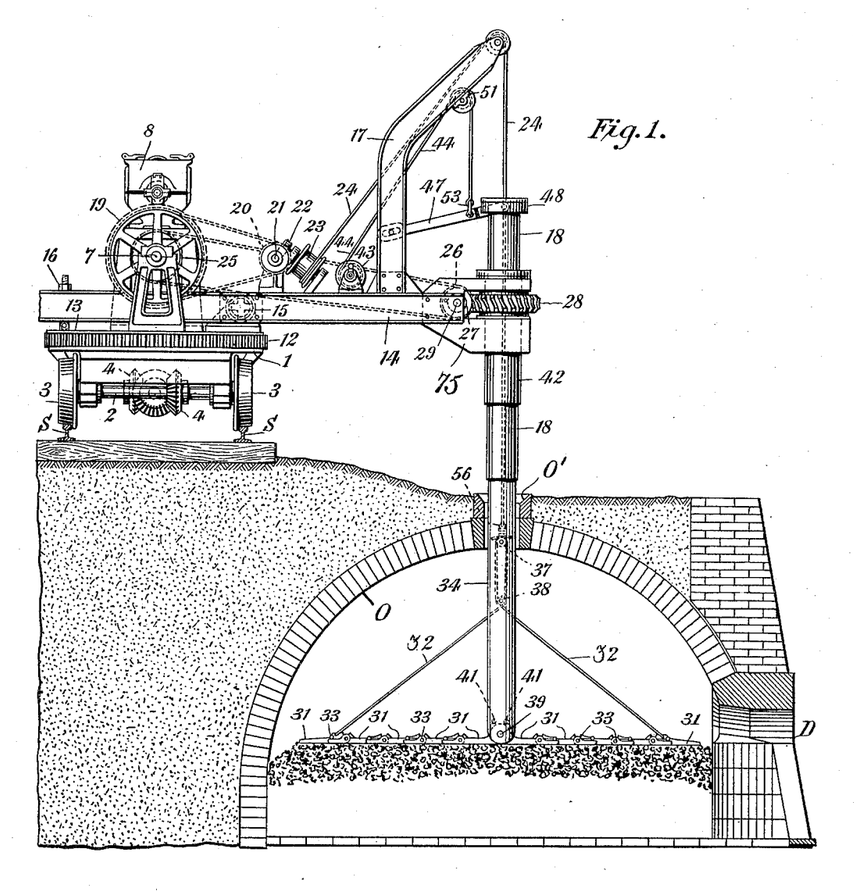
Figure 1 shows a cross section of the oven and a side elevation of the leveler and carriage with the arms extended in position for leveling.
Figures 13, 14, 15, 16, 17, 18:
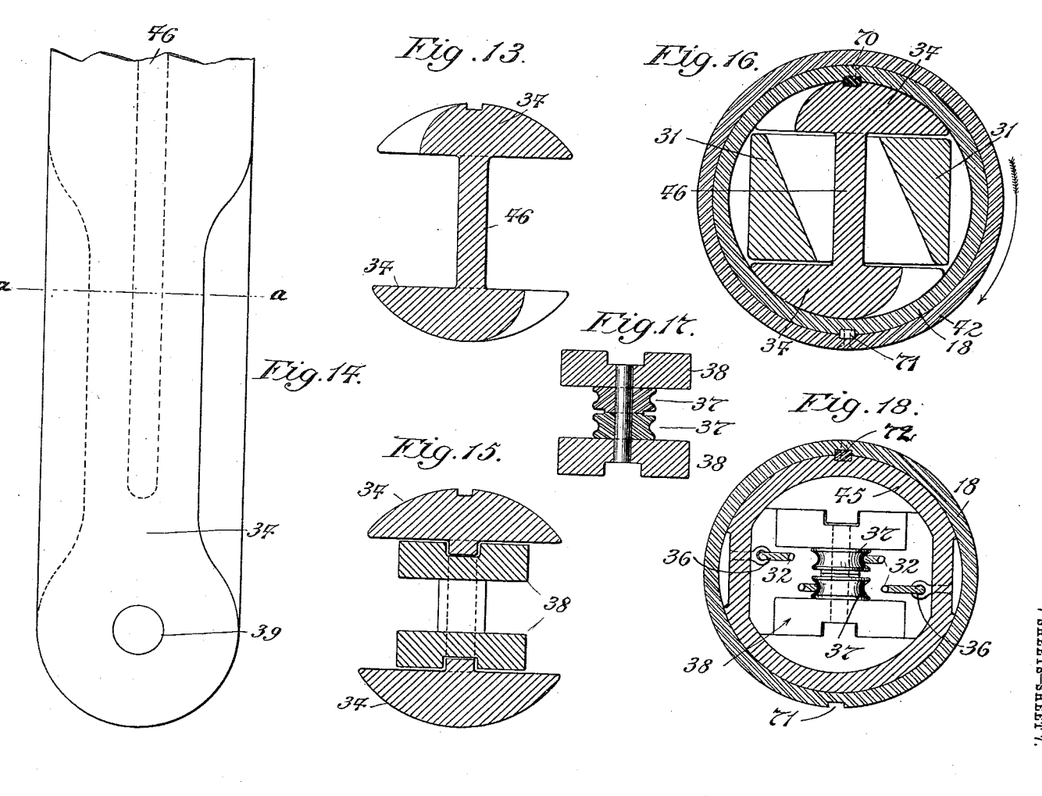
Fig. 13 is a cross-section of the frame on the line $a$—$a$ of Fig. 4 and Fig. 14.
Fig. 14 is enlarged side view of the lower part of the frame.
Fig. 15 is a cross-section of the frame on the line $b$—$b$ of Fig. 4.
Fig. 16 is a cross-section of the tool on the line $c$—$c$ of Fig. 3, showing the tool in folded condition.
Fig. 17 is a cross-section through the hoisting sheaves on the line $e$—$e$ of Fig. 9.
Fig. 18 is a cross-section on the line $d$—$d$ of Fig. 3.

In order to cause the various parts of the leveler to rotate simultaneously with the outer shaft 42, a series of keys arranged to slide in suitable grooves are provided as shown in Figs. 16 and 18. The shaft 34 is caused to rotate with the shaft 18 by means of the key 70, and the shaft 18 is in turn caused to rotate with the shaft 42 by means of the key 71; and for the purposes of strengthening the connection, an additional key 71 is provided on the tubular end 45 of the shaft 34, engaging with the upper end of the shaft 18 as shown in Fig. 18. At its lower end is the pin 39, on which swing the arms 31. These arms consist of any number of jointed members, five being shown in the type shown in Figs. 1, 3 and 4, and they are connected to each other by the pins 33. The arms are raised or lowered by means of the cables 32, which are attached to the outer ends of the arms 31 at the points 49, and after passing over the sliding sheaves and cross head 38 and over the sheaves 37 are attached to the inner cylinder 34 at the points 36 as shown in Fig. 4.

Figure 8:
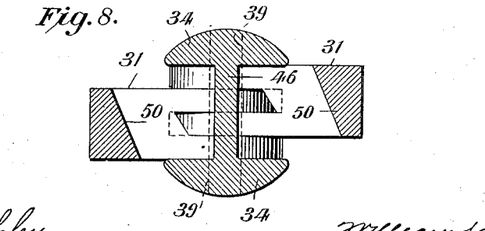

By reference to Fig. 4, it will be seen that in closing the arms, the outer jointed member is first raised by the chain 32 until its stop 40 comes in contact with a similar stop on the next arm. A further closing results in raising the second jointed member until in turn its stop comes in contact with the third inner section and it begins to rise, this action continuing until the first jointed member touches the web 46 of the cylinder 34, when it is drawn up close to and slides along the shaft in the grooves between the flanges 55, and is brought within the diameter of a sufficiently small circle to pass through the opening in the top of the oven. The opening of the arm is due to the weight of the same, since as will be noted by referring to Figs. 3 and 12 the center line of gravity is outside the center of the pin 39, and were the arms not held tightly to the shaft by the cables 24 they would fall apart of their own weight. In order that the arms may properly open within a small space it is essential that the section nearest the shaft should first open, and to insure this the upper surfaces of these inner sections are beveled, as shown by Fig. 8, and a portion on either side of the flanges 55 is cut away in order that the coal may readily enter between the arms and the shaft, and passing between the web 46, of the shaft, and the surfaces 50, of the arms, wedge the latter apart. The weight of the arms will thereupon cause them to open each jointed member in turn descending to a level position. In order to maintain a proper spreading or leveling position of the arms while in operation pins 41 are provided on each side of the cylinder 34, and one side of each inner section of the arms is squared to come in contact with the pins on reaching their leveling position as shown in Fig. 4. Each of the remaining jointed members has an extension on each side 56, which, coming in contact with extended portions of the preceding jointed member maintains its level throughout the remainder of the arm.

Figure 9:
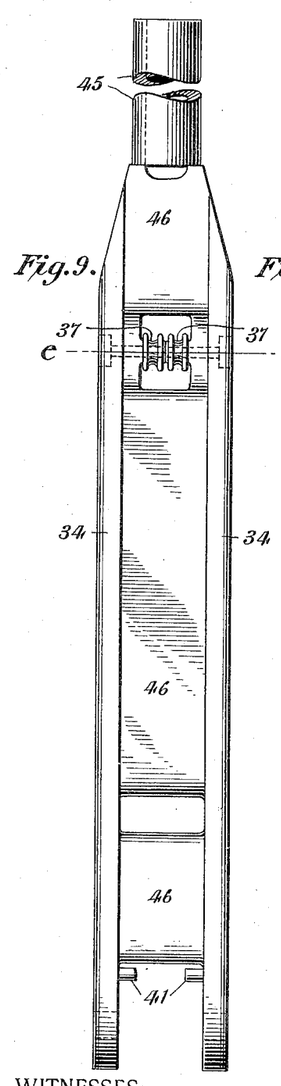
Fig. 9 is a detail elevation of the vertical shaft used with a three jointed arm.
Figures 10, 11, 12:
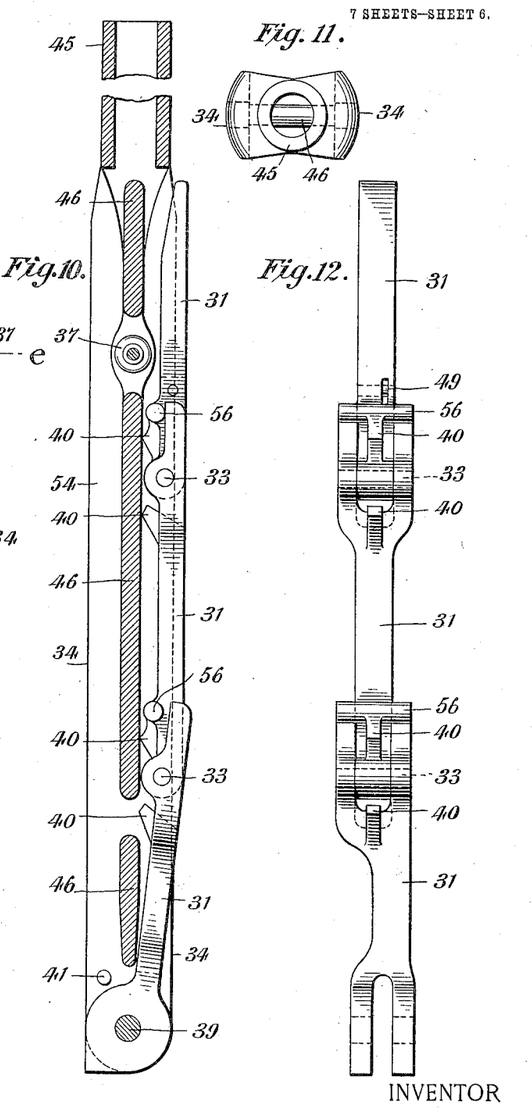

By referring to Figs. 3 and 4 it will be noted that the cross head and sheaves 38 have a different relative position to the cylinder 34 when the arms are opened as compared to the position which they assume when they are closed. After the outward jointed member of the arm has reached the highest position indicated by the dotted lines in Fig. 4 the cross head and sheaves move upward therewith, and the continued upward movement of the cable 24 draws the arms 31 up along and close to the cylinder 34 and a further continuance of this movement draws the cylinder 34 with the arms 31 up within the cylinder 18, taking it up with them until the whole apparatus has been drawn up within the outer tube 42. When in this position the apparatus will easily clear the rails S thus permitting the table 13 to be revolved on its center. When the leveling arms are composed of three jointed members as shown by Figs. 9, 10, 11 and 12, the sliding cross head and sheaves 38, shown in Fig. 4, are omitted and stationary sheaves 37 as shown in Figs. 9 and 10 are substituted therefor. The action of this arm is practically the same as the one already described.

The cylinder 18 is provided at its upper end with a collar as shown in Fig. 3 which, coming in contact with the yoke 48, prevents its further downward movement. The cylinder 18 fits closely within the cylinder 42 so as to slide vertically therein, and it is provided with a spline which will prevent it from rotating independently thereof, and will necessitate its rotating with the cylinder 42 when the latter is rotated by the gear wheel 29. The inner cylinder 34 is also free to move vertically in the cylinder 42, but is provided with suitable splines or keys at any convenient point, whereby it is of necessity rotated by the rotation of the cylinder 42. The yoke 48 is held in any desired position by means of the drum 43 and chain 44, which, passing over the sheave 51, is attached by the clevis 53 to the lever 47 pivoted to the tower 17. The yoke 48 is carried on its trunnions 57 by the lever 47. If the chain 24 is unwound from the drum 23 the weight of the cylinders 18 and 34 causes them to descend until arrested by the collar on the upper end of the cylinder 18 coming in contact with the yoke 48. A further unwinding of the cable 24 allows the arms 31 to move out to their leveling position. It will thus been seen that the depth of the bed of coal in the oven is determined by the position of the yoke 48.

It will be noted that raising the cable 24 raises the sheaves 37 and as the cables 32 are fastened to both ends any movement of the cable 24 gives twice as much movement to the cables 32. In order that the cylinder 34 may rotate without affecting the cable 24, a swivel joint 52 is provided, as shown in Figs. 3 and 4. This is attached to the sheave 37 which raises or lowers the frame 57, and the cable 24 is attached to the upper end of the swivel joint as shown in Fig. 3. By means of the multiplying sheaves 37 and the telescopic shaft 18 the leveling device requires but a minimum head room between the top of the larry rail and the overhead trolley wire.

The method of operation is as follows: The oven is charged in the usual way from a larry, leaving a cone shaped pile of coal in the oven. The larry then goes back for another charge and the operator on the machine throws in the bevel clutch gear 6, and the clutch worm wheel 10, causing the machine to be propelled along the track and revolved about its center until the vertical shaft 18 is centrally located over the opening O¹. These clutches are then thrown out and the clutch sprocket 19 thrown in, allowing the vertical shaft to descend into the coal. The clutch sprocket 45 is then thrown in, which, rotating the vertical shaft, enables the same to bore its way down into the coal until the collar on the cylinder 18 strikes against the yoke 48, when the arms 31 automatically open out. An observer at the door D can, by looking in, direct the operator when the coal in the oven is properly spread or leveled, and, should occasion require it, he can direct the operator to raise or lower the height of the arms by winding or unwinding the cable 44, which is on the drum 43, in order to properly level the oven. In order to withdraw the arms from the oven the motor is reversed, winding up the chain, and withdrawing the whole apparatus from the oven. The machine is then brought forward, located over another oven, and the operations repeated as already described.

I claim as my invention:

1. In a coal leveling machine for beehive ovens, the combination with a vertically movable element of a foldable and extensible arm, consisting of a number of jointed members, and means for operating the same.

2. In a coal leveling machine for beehive ovens the combination with a vertically movable element a plurality of foldable and extensible arms each consisting of a number of jointed members, arranged to be lowered folded into the oven, and then extended and rotated therein.

3. In a coal leveling machine for beehive ovens the combination with a vertically movable element a foldable and extensible arm, consisting of a number of jointed members provided with means for preventing the separate parts of the arm from dropping below a horizontal line, when the same are extended.

4. In a coal leveling machine for beehive ovens the combination with a vertically movable element a plurality of foldable and extensible arms consisting of a number of jointed members each provided with means for preventing the separate parts of the arm from dropping below a horizontal line when the same are extended.

5. In a coal leveling machine, the combination with a vertically movable element of a foldable and extensible arm consisting of a number of jointed members provided with means for preventing the extended arm from dropping below a horizontal line.

6. In a coal leveling machine the combination with a vertically movable element of a plurality of foldable and extensible arms each consisting of a number of jointed members, and each provided with means for preventing the extended arms from dropping below a horizontal line.

7. In a coal leveling machine, the combination with a vertically movable element of a foldable and extensible arm, consisting of a number of jointed members, each provided with devices for preventing the members of the arms from closing in beyond a predetermined angle with each other.

8. In a coal leveling machine the combination with a vertically movable element of a plurality of foldable and extensible arms consisting of a number of jointed members, each provided with devices for preventing the members of the arms from closing in beyond a predetermined angle with each other.

9. In a coal leveling machine for beehive ovens a foldable and extensible arm, consisting of a number of jointed members, and means for lowering it folded into the oven, and then extending and rotating it therein.

10. In a coal leveling machine for beehive ovens, a rotating vertical shaft, composed of two cylinders the inner of which is arranged to slide vertically within the other, and in a suitable supporting cylinder held in a suitable platform; means for moving the inner cylinder within the outer cylinder vertically and the latter vertically within the supporting cylinder, and for rotating them in connection with the supporting cylinder, substantially as described.

11. In a coal leveling machine for beehive ovens, a rotating vertical shaft, composed of two cylinders the inner of which is arranged to slide vertically within the other, and in a suitable supporting cylinder held in a suitable platform; means for moving the inner cylinder within the outer cylinder vertically and the latter vertically within the supporting cylinder, and for rotating them in connection with the supporting cylinder, substantially as described, and a foldable and extensible arm, within the inner cylinder, consisting of a number of jointed members arranged to be lowered folded into the oven, and then extended and rotated therein by the movement of the outer cylinder.

12. In a coal leveling machine for beehive ovens, a rotating vertical shaft, composed of two cylinders the inner of which is arranged to slide vertically within the other, and in a suitable supporting cylinder held in a suitable platform; means for moving the inner cylinder within the outer cylinder vertically and the latter vertically within the supporting cylinder, and for rotating them in connection with the supporting cylinder, substantially as described, a foldable and extensible arm within the inner cylinder, consisting of a number of jointed members, arranged to be lowered folded into the oven, and then extended and rotated therein by the movement of the outer cylinder, and means for preventing the members of the arm from closing in beyond a predetermined angle to each other.

13. In a coal leveling machine for beehive ovens, a rotating vertical shaft, composed of two cylinders the inner of which is arranged to slide vertically within the other, and in a suitable supporting cylinder held in a suitable platform; means for moving the inner cylinder within the outer cylinder vertically and the latter vertically within the supporting cylinder, and for rotating them in connection with the supporting cylinder, substantially as described, a foldable and extensible arm within the inner cylinder, consisting of a number of jointed members, arranged to be lowered folded into the oven, and then extended and rotated therein by the movement of the outer cylinder, and means for preventing the members of the arm from dropping below a horizontal line.

14. In a coal leveling machine for beehive ovens, a rotating vertical shaft, composed of two cylinders the inner of which is arranged to slide vertically within the other, and in a suitable supporting cylinder held in a suitable platform; means for moving the inner cylinder within the outer cylinder vertically and the latter vertically within the supporting cylinder, and for rotating them in connection with the supporting cylinder, substantially as described, a foldable and extensible arm within the inner cylinder, consisting of a number of jointed members, arranged to be lowered folded into the oven, and then extended and rotated therein by the movement of the outer cylinder, and means for preventing the members of the arm from closing in beyond a predetermined angle to each other.

15. In a coal leveling machine for beehive ovens, a rotating vertical shaft, composed of two cylinders the inner of which is arranged to slide vertically within the outer and both to move vertically in a suitable supporting cylinder held in a suitable platform; means for raising and lowering the inner cylinder within the outer, and rotating them in connection with the supporting cylinder, substantially as described, two foldable and extensible arms within the inner cylinder, each consisting of a number of jointed members, arranged to be lowered folded into the oven, and then extended and rotated therein by the movement of the outer cylinder, hoisting cables for raising the arms and suitable devices for raising the cables and drawing up the arms to a folded position.

16. In a coal leveling machine for beehive ovens, a rotating vertical shaft, composed of two cylinders the inner of which is arranged to slide vertically within the outer, and both to move vertically in a suitable supporting cylinder held in a suitable platform; means for raising and lowering the inner cylinder within the outer, and rotating them in connection with the supporting cylinder, substantially as described, two foldable and extensible arms within the inner cylinder, each consisting of a number of jointed members, arranged to be lowered folded into the oven, and then extended and rotated therein by the movement of the outer cylinder, hoisting chains for raising the arms, suitable devices for raising the cables and drawing up the arms to a folded position and means for varying the angles of the hoisting cables as the arms are brought into the shaft.

17. In a coal leveling machine a foldable and extensible arm consisting of a number of jointed members provided with means for forcing out the first member of the arm in order to insure a proper action of same.

18. In a coal leveling machine for beehive ovens, the combination of a plurality of foldable and extensible arms, consisting each of a number of jointed members, and means for forcing out the first member of each of the arms in order to insure a proper action of same.

19. In a coal leveling machine the combination with a vertically movable shaft of a foldable and extensible arm, consisting of a number of jointed members, cables for raising the same into the shaft, and means for varying the angles of the hoisting cables as the arms are brought into the shaft.

20. In a coal leveling machine the combination with a vertically movable shaft of a plurality of foldable and extensible arms, consisting each of a number of jointed members, cables for raising all the same into the shaft, and means for varying the angles of each of the hoisting cables as the arms are brought into the shaft.

21. In a leveling device, the combination of a tubular supporting member, a rotary spreading head having members adapted to telescope within said member composed of pivotally connected parts, whereby said parts are extensible in length, means for operating and controlling said head, and means for suspending and adjusting said member.

22. In a coal leveling apparatus, the combination of a pivotally mounted carrying frame provided with an upper cylinder, a vertically adjustable plunger in spline engagement therewith and provided with a similarly mounted terminal plunger having an adjustable spreader bar, flexible means for adjusting said spreader bar extending through the plungers and cylinder, a sheave for said means, and actuating mechanism therefor, substantially as set forth.

23. In a coal leveling apparatus, the combination of a pivotally mounted carrying frame provided with an upper cylinder, a vertically adjustable plunger in spline engagement therewith and provided with a similarly mounted terminal plunger having an adjustable spreader bar, flexible means for adjusting said spreader bar extending through the plungers and cylinder, a sheave for said means and actuating mechanism therefor, and means for rotating the plungers.

In testimony, that I claim the foregoing as my invention, I have signed my name in presence of two witnesses, this 30 day of June 1908.

WILLIAM SANGSTER.

Witnesses:
　CODA MARSHALL,
　J. E. ROLLINS.

---

Copies of this patent may be obtained for five cents each, by addressing the "Commissioner of Patents, Washington, D. C."